United States Patent
Marella et al.

(10) Patent No.: US 6,180,556 B1
(45) Date of Patent: Jan. 30, 2001

(54) SOLID SUPERACID CATALYSTS FOR THE ISOMERIZATION OF HYDROCARBONS AND SOL-GEL PROCESS FOR THEIR PRODUCTION

(75) Inventors: Marcello Marella; Michele Tomaselli; Letizia Meregalli; Francesco Pinna, all of Venice (IT)

(73) Assignee: VeneziaTecnologie S.p.A., Venice (IT)

( * ) Notice: Under 35 U.S.C. 154(b), the term of this patent shall be extended for 0 days.

(21) Appl. No.: 09/372,140

(22) Filed: Aug. 11, 1999

(30) Foreign Application Priority Data

Aug. 31, 1998 (IT) .............................. MI98A1940

(51) Int. Cl.$^7$ ............................ B01J 27/053; B01J 21/06
(52) U.S. Cl. ........................ 502/217; 502/219; 502/221; 502/222; 502/223
(58) Field of Search .................................. 502/217, 219, 502/221, 222, 223

(56) References Cited

U.S. PATENT DOCUMENTS

| | | | |
|---|---|---|---|
| 4,918,041 | * | 4/1990 | Hollstein et al. ..................... 502/217 |
| 4,956,519 | * | 9/1990 | Hollstein et al. ..................... 585/751 |
| 5,493,067 | * | 2/1996 | Angstadt et al. ..................... 585/731 |
| 5,516,964 | * | 5/1996 | Umansky et al. ..................... 585/751 |
| 5,625,115 | * | 4/1997 | Flego et al. ......................... 585/750 |
| 5,780,383 | * | 7/1998 | Hollstein et al. ..................... 502/324 |
| 6,037,703 | * | 3/2000 | Peratello et al. ..................... 502/217 |

FOREIGN PATENT DOCUMENTS 0 520 543  12/1992 (EP) .
0 718 239  6/1996 (EP) .
0 908 232  4/1999 (EP) .

* cited by examiner

*Primary Examiner*—Bekir L. Yildirim
(74) *Attorney, Agent, or Firm*—Oblon, Spivak, McClelland, Maier & Neustadt, P.C.

(57) ABSTRACT

Solid superacid catalysts, in the form of spheres or microspheres, consisting of a mixed sulfated oxide of zirconium and of at least one other element selected from those of group 3, group 4, group 5, group 6, group 7, group 8 group 9, group 10, group 11, group 12, group 13, group 14, group 15 and those of the series of lanthanides, alone or combined with each other, are characterized in that they are obtained by means of a sol-gel process comprising the following steps:
preparing a zirconium sol, mixed with a thickening agent and optionally with the element or elements selected;
adding, only when microspheres are to be obtained, a non-ionic surface-active agent, to the sol; dripping, obtaining spheres, or atomising, obtaining microspheres, the sol into a basic gelation bath; ageing the spheres or microspheres of gel thus obtained;
washing the spheres or microspheres with water up to pH=9; and draining them without drying them;
impregnating the spheres or microspheres of gel with an aqueous solution of ammonium sulfate or, if it is not possible to obtain cogelation of the element selected with the zirconium hydroxide, with a solution of ammonium sulfate and a salt of said element selected;
drying the spheres or microspheres and calcining them in air at temperatures ranging from 450° C. to 700° C.
In particular, the solid superacid catalysts, when the element of group 13 is Al, can be conveniently used for isomerizing aliphatic hydrocarbons having a low molecular weight.

11 Claims, No Drawings

SOLID SUPERACID CATALYSTS FOR THE ISOMERIZATION OF HYDROCARBONS AND SOL-GEL PROCESS FOR THEIR PRODUCTION

BACKGROUND OF THE INVENTION

1. Field of the Invention

The present invention relates to solid, superacid catalysts, based on zirconia and mixed sulfated oxides, obtained directly via sol-gel, with a non-alkoxide synthesis method, in the forms of use, microspheres, or spheres having dimensions of up to 3 mm and over, and with textural and mechanical characteristics which make them suitable for isomerization processes of hydrocarbons, verified by means of the model conversion reaction of n-butane to iso-butane.

2. Description of the Background

Interest in solid (super)acid catalysts derives from considerations of an environmental nature, associated with improvements in industrial isomerization and alkylation processes of hydrocarbons, which use large quantities of sulfuric or hydrofluoric acid in emulsion.

If solid acids can be compared with the known liquid superacids, the question will remain open until a clear definition of solid superacid is formulated [J. Sommer et al., Catal. Today, 38 (1997)309]. In fact, whereas the definition of liquid superacid is based on the definition of R. J. Gillespie [Adv. Phys. Org. Chem., 9 (1972)1]: any acid stronger than sulfuric acid at 100% ($H_0$=−12 in Hammett's acidity scale), the most convincing evidence of the superacid nature of a solid should be, viceversa, its capacity to reversibly protonize an alkane, exploiting the σ- basicity of the C—H or C—C bond [G. A. Olah, Angew. Chem. Int. Ed. Engl., 12 (1973) and J. Sommer et al., J. Am. Chem. Soc., 19 (1997)3274].

Among all linear alkanes, n-butane is the most difficult to isomerize, requiring the formation of a primary isobutyl cation. On the other hand, isobutane is an essential intermediate for the production of alkylated and oxygenated products for fuel.

It has been known for some time that sulfated zirconia is a solid acid, active in the isomerization of n-butane [M. Hino et al., Chem. Lett., (1979)1259]. The tetragonal, rather than monoclinic sulfated phase, seems to be the active crystalline phase of this material [C. Monterra et al., J. Catal., 157 (1995) 109].

The doping of sulfated zirconia with transition elements favourably influences the isomerization rate of n-butane, in particular the combination of mixed oxides of iron and manganese [F. C. Lange et al., Catal. Lett., 41 (1996)95]. The addition of 0.4% Pt to a sulfated zirconia, doped with iron and manganese oxides, produces an increase in the activity with respect to sulfated zirconia alone [X. M. Song et al., Catal. Lett., 37 (1996)187]. The role of the metal consists in favouring the hydrogenation/dehydrogenation mechanism, by inhibiting the formation of carbonaceous substances, which can deactivate the system. Its role therefore consists in establishing a bifunctional mechanism, by increasing the surface concentration of the olefins, rather than increasing the acid strength of the sites [F. Garin et al., J. Catal., 151 (1995)26]. As a consequence, a considerable increase in the life of the catalyst is observed [J. C. Yori et al., Appl. Catal., 129 (1995)83] and, following this scheme, doping with iridium and platinum allows more active sulfated zirconias to be obtained [M. Hino et al., Catal. Lett. 30 (1995)25 and J. C. Yori et al., Appl. Catal.:A, 129 (1995)83].

A promoting role of aluminum has recently been observed, which is different from that of transition metals, in stabilizing the surface sulfated complex and increasing the number of acid sites with intermediate acid strength, the most effective for the isomerization of n-butane [Z. Gao et al., Topics in Catalysis, 6 (1998)101].

Finally, $WO_3$ also makes zirconia a strong solid acid [M. Hino et al., Chem. Commun., (1987)1259] and Pt (0.3%) promotes the selective hydroisomerization of alkanes, from n-heptane upwards, at 373–473K, without the formation of carbonaceous substances [E. Inglesia et al., J. Catal., 144 (1993)238].

U.S. Pat. No. 5,750,459 of the same applicant describes a sol-gel process for the production of spheres and microspheres of pure zirconia or mixed oxides based on zirconia, obtained starting from a basic zirconium carbonate, and useful as catalysts or carriers for catalysts. This patent provides a detailed description of the procedure for obtaining pure zirconia spheres, example 1, pure zirconia microspheres, example 2, and spheres of mixed zirconia-alumina oxides (10% by weight), example 4.

PCT/US97/07424 describes a sol-gel process for the production of sulfated zirconia, obtained starting from zirconium alkoxides mixed with acetylacetone in a solution of ethanol, and precipitated in an acidified mixture of a $C_8$–$C_{18}$ alkylamine and water. The sulfation process with diluted sulfuric acid takes place on powders dried at 110° C., after precipitation, aging, centrifugation and extraction with ethanol. The end-catalyst, sulfated zirconia in powder form, is obtained after calcination of the solid at temperatures ranging from 600 to 750° C. for about two hours. As an alternative, the same patent describes a process in which sulfated zirconia in powder form is obtained by hydrolysis of a solution of zirconyl chloride in diluted ammonia, washing with water and drying at 110° C., powdering and impregnation in diluted sulfuric acid for 5 hours, filtration and calcination at about 650° C.

CA-2069373 describes a process in which the life of the superacid catalyst is prolonged if the isomerization is carried out under supercritical conditions or almost critical conditions. Example 1 of this patent describes a procedure in which the superacid catalyst in powder form is obtained by hydrolyzing at pH 7–8, with an ammonia solution, a solution of a zirconium salt, obtained starting from a zirconium carbonate dissolved in nitric acid. The precipitate is separated, washed, filtered, dried and ground. It is then impregnated using the "incipient wetness" method with a solution of ammonium sulfate, dried and calcined at 725° C. The sulfated zirconia thus obtained contains a percentage of sulfates of 4%. Optionally, the example also describes the incorporation of one or more transition metals, for example Fe and Mn, onto the sulfated zirconia. The catalyst is obtained, alternatively, by impregnating a salt of the metal either onto dried zirconium hydroxide or sulfated hydroxide.

A similar superacid catalyst, based on sulfated zirconia, obtained however starting from a solution of zirconium oxychloride, hydrolyzed with a solution of ammonia, and then impregnating the dry powder with sulfuric acid, and others based on sulfated titania and sulfated iron oxide are described in U.S. Pat. No. 5,017,699. These catalysts are claimed in the synthesis of polyalkyl ethers of polymethylolmelamine compounds.

EP-0759423 describes a superacid catalyst obtained, again starting from a solution of zirconium oxychloride, as in the previous patent, but impregnating the dry product with a solution of ammonium sulfate and calcinating at 650° C.

This catalyst is useful in the synthesis of isobornyl methacrylate or acrylate.

JP-01/245853 describes a process for obtaining a catalyst with a high alkylation activity. Metals of group IIb, such as Zn, Cd, or of group Va, such as V, or of group VIa, such as Cr, Mo or of group VIIa, such as Mn, or their compounds, and a radical of sulfuric acid or one of its precursors, are supported on a hydroxide or oxide of metals of group III, such as Al, Ga and/or of group IV, such as Ti and Zr, followed by calcination and stabilization at temperatures of about 400–800° C.

EP-0653397 discloses a method for the preparation of superacids based on sulfated zirconia, which incorporates, by means of "incipient wetness" impregnation, heteropolyacid (HPA) components or polyoxoanionic (POA) components, which give advantageous properties for effecting alkylation processes in liquid phase of isoparaffins to olefins. In the invention, preference is given to HPA or POA having the Keggin structure, represented by the formula $H_4XM_{14}O_{40}$, wherein X can be any metal of groups IV, V, VI, VIII, or lanthanides, and M is any element of groups III, IV, V, VI.

EP-0661254 describes a process for improving the oxidative dehydrogenation of light alkanes to olefins, or of alkylaromatic compounds, using a solid superacid catalyst. Examples of solid superacid catalysts are: sulfated zirconia, sulfated titania, sulfated alumina, halogenated alumina, etc.; used alone or combined with one or more metals capable of increasing the acidity, preferably V, Cr, Mn, Fe, Zn, Co, Sn, Pb, Ca and Sb.

WO-98/09727 describes a superacid catalyst formed with traditional ceramic techniques.

EP-0504741 discloses a method for producing hydrogen peroxide directly in a reaction medium containing a promoter, for example, a halogenated compound, in the presence of a metal of the platinum group supported on a solid acid or solid superacid. The solid superacid consists of sulfated zirconia, alumina or titania, calcined preferably from 400 to 600° C. As there may be problems of dissolution of the sulfate ion if the superacid is placed for long periods of time in a reducing environment, a solid superacid consisting of metal oxides is preferable for this type of reaction. These metal oxides preferably consist of molybdenum oxides or tungsten oxide supported on zirconia. The calcination temperatures preferably range from 600 to 800° C. The form of solid superacid can be a microfine powder, grains or pellets. No mention is made in this patent of the techniques, preferably of the traditional ceramic type, for obtaining these forms.

Finally, JP-06/321878 describes in an example a solid superacid obtained by impregnating zirconium hydroxide with 8 parts by weight of sulfuric acid 1N and, after drying, calcination at 570° C. for 3 hours. The catalyst is claimed as being useful in the synthesis of esters containing amine groups.

None of the above processes describes a reliable method for the production, via sol-gel, of solid superacid catalysts based on zirconia, directly into a form which can be used in industrial isomerization and alkylation processes of hydrocarbons with a low molecular weight.

As previously specified in the known art, processes using synthesis phases possibly belonging to sol-gel methods, although more similar to precipitation techniques, invariably lead to the production of more or less agglomerated fine powders (which therefore also need grinding phases), from which the synthesis of the solid superacid is initiated.

Bearing in mind that interest in solid superacids is due to the possible substitution of traditional strong liquid acids, such as $H_2SO_4$ or HF, for considerations of an environmental nature and to comply with regulations which are becoming stricter and stricter in this field, it is evident however that a solid superacid cannot be used directly in the form of a very fine powder. In fact, this would imply facing very serious problems of liquid-solid separation which are not easy to solve.

The only alternative is to resort to the traditional pelletization, extrusion or pressing, ceramic techniques as mentioned for example in WO-98/09727 and EP-0504741.

These techniques inevitably have counter-indications due to heterogeneity in the structure of the end-catalyst and therefore in its textural properties and also due to the use of various additives, both organic and inorganic, whose influence on the catalytic properties of the system is often not known or ignored.

Sol-gel techniques are absolutely preferable from the point of view of homogeneity of the chemical compositions; however neither techniques which use costly metal alkoxides, in particular zirconium, as starting materials, for example in PCT/US97/07424, nor those using less costly salts, for example in CA-2069373, offer solutions for the direct synthesis of a form of solid superacid catalyst which can be used under real isomerization process conditions.

U.S. Pat. No. 5,750,459 discloses a sol-gel process for the production of spheres (and microspheres) of pure zirconia or mixed oxides based on zirconia, useful as catalysts or carriers for catalysts. However it does not disclose any process which can be simply used by any expert in the field for obtaining solid superacids based on zirconia.

In fact the most widely-used impregnation technique, the "incipient wetness" method, which can alternatively be used on dried material or calcined material, does not provide any useful result in this specific case. Experiments effected by impregnating with solutions of sulfuric acid or ammonium sulfate, more or less dilute, have not produced at the end of the calcination process at the temperatures indicated in literature of 400–700° C., structurally resistant spheres but pretensioned materials susceptible to considerable cracking, before and mainly after catalytic isomerization tests. The phenomenon is more serious when Pt, for example, is used as promoter.

A solution could therefore be to introduce the precursor of sulfate ions directly into the sol and follow the procedures for the preparation of spheres as described in the examples of U.S. Pat. No. 5,750,459. However, apart from the integrity of the spheres at the end of the calcination treatment, there would be no control over the stoichiometric ratio $Zr^{4+}/SO_4^{2-}$ as, after dripping the sol into the gelation bath, during the aging of the spheres of gel in the bath, dissolution kinetics of the sulfates present inside the sphere would be established, which would depend on a considerable number of parameters and in particular the aging time and relative gel/gelation bath volumetric ratio.

SUMMARY OF THE INVENTION

It has been surprisingly found, on the other hand, that it is possible to obtain a solid superacid catalyst, based on sulfated zirconia, with appropriate textural and mechanical characteristics, by subjecting the spheres of gel to impregnation, immediately after aging and simple washing up to pH 9, with a solution of ammonium sulfate.

The solid superacid catalysts of the present invention, in the form of spheres or microspheres consisting of a mixed sulfated zirconium oxide and at least one other element selected from those of group 3 (according to the new IUPAC agreement), preferably Y or La, group 4, preferably Ti, group 5, group 6, preferably W, group 7, preferably Mn, group 8, preferably Fe, group 9, preferably Co, group 10, preferably Ni, group 11, preferably Cu, group 12, preferably Zn, group 13, preferably Al, Ga or In, group 14, preferably Si, Sn or Pb, group 15, preferably Sb or Bi, and those of the series of lanthanides, preferably Ce, Nd, Sm or Eu, alone or combined with each other, are characterized in that they are obtained by means of a sol-gel process comprising the following steps:

preparing a zirconium sol, mixed with a thickening agent and optionally with the element or elements selected;

adding, only when microspheres are to be obtained, a non-ionic surface-active agent (for example iso-octylphenoxy-polyethoxy-ethanol), to the sol;

dripping, obtaining spheres, or atomizing, obtaining microspheres, the sol into a basic gelation bath;

aging the spheres or microspheres of gel thus obtained;

washing the spheres or microspheres with water up to pH=9 and draining them without drying them;

impregnating the spheres or microspheres of gel with an aqueous solution of ammonium sulfate or, if it is not possible to obtain cogelation of the element selected with the zirconium hydroxide, with a solution of ammonium sulfate and a salt of said element selected;

drying the spheres or microspheres and calcinating them in air at temperatures ranging from 450° C. to 700° C.

DETAILED DESCRIPTION OF THE PREFERRED EMBODIMENTS

The oxide of the other element (or oxides of the other elements) in the mixed sulfated oxide preferably ranges from 0.5 to 30% by weight.

When the element selected is aluminum, in the mixed sulfated oxide the alumina more preferably ranges from 0.5 to 8% by weight.

The sulfate groups contained in the superacid catalysts preferably range from 1% to 15% by weight (with respect to the dry product), more preferably from 3% to 10% by weight with respect to the dry product).

As specified above, these catalysts can be obtained in the form of spheres, with end dimensions preferably ranging from 0.5 mm to 5 mm, more preferably about 2 mm, or in the form of microspheres with a diameter preferably ranging from 1 micron to 0.5 mm.

Depending on the uses, these solid superacid catalysts may also contain one or more precious metals selected from Pt, Pd, Rh, Ru, Ir and Au.

The impregnation procedure, described in detail in the examples, allows a homogeneous distribution of the sulfate groups to be obtained within the sphere and, at the same time, guarantees its integrity at the various calcination temperatures, as can be observed from the "crush strength" data of the single spheres, effected according to the international regulation ASTM D 4179.

It has also been demonstrated that it is possible to establish with close accuracy the percentage quantity of sulfates present on the spheres after drying at 110° C., on the basis of a formula empirically established in relation to the concentrations of the impregnation solutions ($C_0$), if the ratio between the gel mass to be impregnated and the volume of the impregnation solution (1750 g/l) is kept constant. This ratio is that which allows a certain gel mass to be covered with a minimum volume of impregnation solution.

The formula is the following:

$$\%SO_4^-{}_{CALC} = 103.2\, C_0^{0.908}/(1.032\, C_0^{0.908} + 275)$$

The agreement of the calculated data with the analytical data can be verified from table 1.

It has been even more surprisingly found that it is possible to obtain a superacid catalyst which is very active in the isomerization of hydrocarbons with a low molecular weight (having from 4 to 7 carbon atoms) and stable over a period of time, so that the incorporation of a promoter, such as Pt, is not necessarily required, if a mixed sulfated zirconia-alumina oxide is used instead of pure sulfated zirconia.

The process for the isomerization of aliphatic hydrocarbons with a low molecular weight, a further object of the present invention, by means of the solid superacid catalysts specified above containing aluminum, comprises the following steps:

introducing the calcined spheres into a reactor and activating them in air at a temperature ranging from 300° C. to 500° C., preferably from 450° C. to 500° C.;

introducing a reagent mixture with an $H_2$/n-paraffin ratio varying from 2/1 to 10/1, preferably from 3/1 to 5/1, with a space velocity (GHSV) ranging from 2000 to 10000 $h^{-1}$;

effecting the reaction at temperatures lower than 300° C., preferably from 230 to 270° C.

The reaction can also be carried out without hydrogen. Inert gases, such as nitrogen, helium or argon can be used.

The basic composition of a mixed oxide of this type, in particular with a weight percentage content of $Al_2O_3$ of 10%, has already been described in example 4 of U.S. Pat. No. 5,750,459. The compositions tested herein have a lower content of $Al_2O_3$: 0.83% by weight, 1.66%, 2.5%, 4.2% and 7.6%, as indicated in examples 2, 3, 4, 5 and 6 respectively. All the impregnation procedures were carried out on the spheres in gel form after washing and draining of the liquid, as previously described for pure zirconia.

The effect of introducing the sulfate groups substantially causes, together with that of the alumina content, a shift in the crystallization of the zirconia towards higher temperatures, as can be observed from the maximum of the exothermic crystallization peak in the DTA curves, effected with a heating rate of 2° C./min. The values are indicated in the tables of the various examples. On comparing, for example, the value of 660° C. of the crystallization peak of a material with $Al_2O_3$ 10% (U.S. Pat. No. 5,750,459, column 4, line 28), with the same temperature value, example 5, it can be seen that this temperature can be reached with $Al_2O_3$ 4.2%+$SO_4^{2-}$ 7.3% (value with respect to dry product). However, contents of $SO_4^{2-}$ which are higher than this value make it practically impossible to determine the presence of the peak, even with $Al_2O_3$ 0.83%.

From a structural point of view, for the various materials calcined under the same temperature conditions and for the same time (3 hours), the X-diffraction shows:

for products calcined at 450° C.: amorphous materials, for all sulfate contents and for $Al_2O_3 \geq 2.5\%$; materials slightly crystallized, for the two lowest contents of $SO_4^{2-}$ and $Al_2O_3 = 1.66\%$, amorphous for higher sulfate contents; a well crystallized material for the lower sulfate content for $Al_2O_3 = 0.83\%$, a slightly crystallized material for $SO_4^{2-} = 2.8\%$ (with respect to the dry product) and amorphous materials in the other cases;

for products calcined at 550° C.: amorphous materials, for the two higher sulfate contents and for $Al_2O_3 \geq 4.2\%$, materials slightly crystallized for the other contents of $SO_4^{2-}$; an amorphous material for the higher sulfate content and for $Al_2O_3 = 2.5\%$, slightly crystallized for $SO_4^{2-} = 7.6\%$ (with respect to the dry product) and materials becoming increasingly more crystallized on reducing the sulfate content; materials slightly crystallized for the higher sulfate content and $Al_2O_3 \leq 1.66\%$ and becoming increasingly more crystallized on reducing the sulfate content;

for products calcined at 650° C.: well crystallized materials for all sulfate contents and for $Al_2O_3 \geq 1.66\%$; particularly well crystallized materials for $Al_2O_3 = 0.83\%$ and for all sulfate contents.

In all the cases of well crystallized material, the crystalline structure has a tetragonal lattice, more or less distorted by the presence of $Al_2O_3$ and $SO_4^{2-}$ groups.

The "crush strength" measurements, only effected on alternating sulfate contents and for calcination temperatures of 550° C. and 650° C. (the latter being more interesting for the isomerization tests), showed the following tendency:

for products calcined at 550° C.: excellent mechanical characteristics, in the order of 37–38 N;

for products calcined at 650° C.: much lower mechanical resistances, of about 11–12 N, but in any case capable of keeping the material structurally integral, even after use.

For accurate average values, standard deviations, "80% spread" and "95% reliability, as required by the regulation ASTM D 4179, reference should be made to the tables enclosed with the various examples.

The textural property measurements, carried out with BET Micromeritics ASAP 2000 equipment, invariably show a unimodal distribution of the pore dimensions, with the maximum situated close to the lower limit of the mesoporosity range (2–50 nm according to the IUPAC agreement). For accurate values of the position of this maximum, as well as those of the surface area and cumulative pore volume, determined from the adsorption branch in the $N_2$ adsorption/desorption hysteresis, reference should be made to the single compositions in the tables of the various examples.

Some examples of sol-gel synthesis of solid superacids in the form of spheres, based on mixed zirconia-alumina oxides and containing $SO_4^{2-}$ groups as group capable of supplying the superacid properties, are provided hereunder. Example 1 describes the preparation method of a pure sulfated zirconia, which should be considered as reference and comparative material, in the isomerization tests, for the other compositions based on mixed sulfated zirconia-alumina oxides, described in examples 2–6.

The following examples describe the procedures and results of the catalytic isomerization tests of n-butane to iso-butane.

These examples should be considered as representing the invention itself but do not limit its scope in any way. In fact, although examples are provided which relate to sphere dimensions of about 2 mm, these spheres can be prepared with dimensions of up to 3 mm and even more. In addition, the whole range of compositions specified in the examples can be prepared in the form of microspheres, in diameters ranging from 1 micron to 0.5 mm, as already described and claimed in U.S. Pat. No. 5,750,459.

As far as the compositions themselves are concerned, in the zirconium oxide mixed with another metal, the aluminum can be either totally or partially substituted by one or other metals, to give the carrier particular properties and/or to synergically increase the superacid properties of the material at the end of the sulfation process and subsequent calcination, according to what is described in international literature and in particular previously in the description of the invention itself.

Some compositions have already been already described in the examples of U.S. Pat. No. 5,750,459: for example, a mixed zirconia-yttria oxide (example 3), a mixed zirconia-alumina oxide-copper oxide (example 5), a mixed zirconia-alumina-ceria oxide (example 7).

As can be observed from example 7, which describes the catalytic tests, the catalysts containing alumina have a good activity in the isomerization reaction of n-butane and a considerable stability over a period of time without necessarily requiring the presence of precious metals, in particular Pt.

The selectivities to iso-butane are very high and traces (less than 4%) of propane and pentane can be found in the products.

EXAMPLE 1

Spherical catalysts of zirconium oxide containing various sulfate contents (ZS)

For the preparation of a solution of zirconium in $H_2O$ with a molar ratio $[NO3^{-}]/[Zr^{4+}]$ of about 0.8, reference should be made to patent application IT-MI194A2588. A typical preparation, for example, of a zirconium solution in $H_2O$ at a concentration, formally expressed as $ZrO_2$, of 212 g/l is the following:

4.63 l of $HNO_3$ at 68% are added to 30 l of $H_2O$. The solution, is heated, under stirring, to 60–70° C. and 26.5 Kg of $2 ZrO_2.CO_2.H_2O$ (basic zirconium carbonate), are then added progressively. The mixture is left under stirring to favour the dissolution of the zirconium salt and the development of $CO_2$. When the solution becomes limpid, it is left to cool and $H_2O$ is added until a volume of 50 l is reached.

Preparation of the sol:

1685 ml of the zirconium solution in $H_2O$ (212 g/l as ZrO2)

15 g of hydroxypropyl-methylcellulose dispersed in about 700 ml of $H_2O$ and thickened with a few drops of concentrated ammonia (30%)

60 g of soluble starch the whole mixture brought to 3 l with $H_2O$

Composition of the gelation bath:

aqueous solution of concentrated ammonia (30%) diluted 1:1 by volume with $H_2O$ Drip equipment:

1 or more capillary tubes (internal diameter=4 mm, external diameter=6 mm)

Aging time: 17 h; washing up to pH 9 with $H_2O$.

The gel, after the washing liquid has been drained, is impregnated with aqueous solutions at a varying concentration of $(NH_4)_2SO_4$ in a ratio of 600 ml of solution every 1.05 Kg of gel and the whole mixture is left to rest for 19 h. Typically:

455 g of gel are immersed in 260 ml of a solution, for example, 0.3 M, of $(NH_4)_2SO_4$.

After the impregnation solution has been drained, the gel is left to dry for 1 day at 110° C.

Calcination program: 2K/min. Up to the maximum temperature, maintained for 3 h, then cooling to room temperature.

The final diameter of the spheres after calcination at the maximum temperature is 2.2 mm.

The preparative data are provided in table 1.

The textural and mechanical properties are indicated in table 2 —example 1.

EXAMPLE 2

Spherical catalysts of mixed zirconium-alumina oxide (0.83% by weight) containing various sulfate contents (Z0.83AS)

Preparation of a solution of zirconium in $H_2O$ at a concentration, formally expressed as $ZrO_2$, of 212 g/l with a molar ratio $[NO3^-]/[Zr^{4+}]$ of about 0.8: as in example 1.

Preparation of the sol:
1169 ml of the zirconium solution in $H_2O$ (212 g/l as $ZrO_2$)
20.75 g of a solution in $H_2O$ of alumina hydrate (10% by weight as $Al_2O_3$)
12.5 g of hydroxypropyl-methylcellulose dispersed in about 700 ml of $H_2O$ and thickened with a few drops of concentrated ammonia (30%)
50 g of soluble starch the whole mixture brought to 2.5 l with $H_2O$ Composition of the gelation bath:
aqueous solution of concentrated ammonia (30%) diluted 1:1 by volume with $H_2O$ Drip equipment:
1 or more capillary tubes (internal diameter=4 mm, external diameter=6 mm)

Aging time: 17 h; washing up to pH 9 with $H_2O$.

Impregnation:
As in example 1. For example: 367.5 g of gel are immersed in 210 ml of a solution, for example 0.4 M, of $(NH_4)_2SO_4$ Drying and calcination:
As in example 1

The final diameter of the spheres after calcination at the maximum temperature is 2.2 mm.

The preparative data are provided in table 1.

The textural and mechanical properties are indicated in table 3—example 2.

EXAMPLE 3

Spherical catalysts of mixed zirconium-alumina oxide (1.66% by weight) containing various sulfate contents (Z1.66AS)

Preparation of a solution of zirconium in $H_2O$ at a concentration, formally expressed as $ZrO_2$, of 212 g/l with a molar ratio $[NO3^-]/[Zr^{4+}]$ of about 0.8: as in example 1.

Preparation of the sol:
1160 ml of the zirconium solution in $H_2O$ (212 g/l as ZrO2)
41.5 g of a solution in $H_2O$ of alumina hydrate (10% by weight as $Al_2O_3$)
12.5 g of hydroxypropyl-methylcellulose dispersed in about 700 ml of $H_2O$ and thickened with a few drops of concentrated ammonia (30%)
50 g of soluble starch
the whole mixture brought to 2.5 l with $H_2O$ Composition of the gelation bath:
aqueous solution of concentrated ammonia (30%) diluted 1:1 by volume with $H_2O$ Drip equipment:
1 or more capillary tubes (internal diameter 4 mm, external diameter=6 mm)

Aging time: 17 h; washing up to pH 9 with $H_2O$.

Impregnation:
As in example 1.
Drying and calcination:
As in example 1
The final diameter of the spheres after calcination at the maximum temperature is 2.2 mm.
The preparative data are provided in table 1.
The textural and mechanical properties are indicated in table 4—example 3.

EXAMPLE 4

Spherical catalysts of mixed zirconium-alumina oxide (2.5% by weight) containing various sulfate contents (Z2.5AS)

Preparation of a solution of zirconium in $H_2O$ at a concentration, formally expressed as $ZrO_2$, of 212 g/l with a molar ratio $[NO_3^-]/[Zr^{4+}]$ of about 0.8: as in example 1.

Preparation of the sol:
1150 ml of the zirconium solution in $H_2O$ (212 g/l as $ZrO_2$)
62.5 g of a solution in $H_2O$ of alumina hydrate (10% by weight as $Al_2O_3$)
12.5 g of hydroxypropyl-methylcellulose dispersed in about 700 ml of $H_2O$ and thickened with a few drops of concentrated ammonia (30%)
50 g of soluble starch
the whole mixture brought to 2.5 l with $H_2O$ Composition of the gelation bath:
aqueous solution of concentrated ammonia (30%) diluted 1:1 by volume with $H_2O$ Drip equipment:
1 or more capillary tubes (internal diameter=4 mm, external diameter=6 mm)

Aging time: 17 h; washing up to pH 9 with $H_2O$.

Impregnation:
As in example 1.
Drying and calcination:
As in example 1
The final diameter of the spheres after calcination at the maximum temperature is 2.2 mm.
The preparative data are provided in table 1.
The textural and mechanical properties are indicated in table 5—example 4.

EXAMPLE 5

Spherical catalysts of mixed zirconium-alumina oxide (4.2% by weight) containing various sulfate contents (Z4.2AS)

Preparation of a solution of zirconium in $H_2O$ at a concentration, formally expressed as $ZrO_2$, of 212 g/l with a molar ratio $[NO_{3-}]/[Zr^{4+}]$ of about 0.8: as in example 1.

Preparation of the sol:
1130 ml of the zirconium solution in $H_2O$ (212 g/l as $ZrO_2$)
104.3 g of a solution in $H_2O$ of alumina hydrate (10% by weight as $Al_2O_3$)
12.5 g of hydroxypropyl-methylcellulose dispersed in about 700 ml of $H_2O$ and thickened with a few drops of concentrated ammonia (30%)
50 g of soluble starch
the whole mixture brought to 2.5 l with $H_2O$ Composition of the gelation bath:
aqueous solution of concentrated ammonia (30%) diluted 1:1 by volume with $H_2O$ Drip equipment:
1 or more capillary tubes (internal diameter=4 mm, external diameter=6 mm)
Aging time: 17 h; washing up to pH 9 with $H_2O$.
Impregnation:
As in example 1.
Drying and calcination:
As in example 1
The final diameter of the spheres after calcination at the maximum temperature is 2.2 mm.
The preparative data are provided in table 1.
The textural and mechanical properties are indicated in table 6—example 5.

EXAMPLE 6

Spherical catalysts of mixed zirconium-alumina oxide (7.6% by weight) containing various sulfate contents (Z7.6AS)

Preparation of a solution of zirconium in $H_2O$ at a concentration, formally expressed as ZrO2, of 212 g/l with a molar ratio $[NO_3^-]/[Zr^{4+}]$ of about 0.8: as in example 1.
Preparation of the sol:
1090 ml of the zirconium solution in $H_2O$ (212 g/l as $ZrO_2$)
189 g of a solution in $H_2O$ of alumina hydrate (10% by weight as $Al_2O_3$)
12.5 g of hydroxypropyl-methylcellulose dispersed in about 700 ml of $H_2O$ and thickened with a few drops of concentrated ammonia (30%)
50 g of soluble starch
the whole mixture brought to 2.5 l with $H_2O$
Composition of the gelation bath:
aqueous solution of concentrated ammonia (30%) diluted 1:1 by volume with $H_2O$
Drip equipment:
1 or more capillary tubes (internal diameter=4 mm, external diameter=6 mm)
Aging time: 17 h; washing up to pH 9 with $H_2O$.
Impregnation:
As in example 1.
Drying and calcination:
As in example 1
The final diameter of the spheres after calcination at the maximum temperature is 2.2 mm.
The preparative data are provided in table 1.
The textural and mechanical properties are indicated in table 7—example 6.

EXAMPLE 7

Catalytic Tests 0.5 g of catalyst calcined at 650° C. are placed in a tubular flow reactor and reactivated in air at 450° C. The activity test is carried out at 250° C. and atmospheric pressure, with a gaseous mixture of hydrogen:n-butane with a molar ratio 4:1. The space velocity (GHSV) is=5000 $h^{-1}$.

The reaction products, measured by means of a gas chromatograph in line, essentially consist of iso-butane and traces of propane and pentane (<4%). The conversion of n-butane after various reaction times is indicated in table 8.

TABLE 1

Catalysts prepared and relative analyses

| Composit. | $Al_2O_3$ (w %) | Impreg. solution of $SO_4^=$ $C_0$ (g/l) | w % of $SO_4^=$ in gel dried at 110° C. (calculated) | w % of $SO_4^=$ in gel dried at 110° C. (analysis) | Crystallization temperature (° C.) (DTA analysis) | w % of $SO_4^=$ in product calcined at 450° C. | w % of $SO_4^=$ in product calcined at 550° C. | w % of $SO_4^=$ in product calcined at 650° C. |
|---|---|---|---|---|---|---|---|---|
| ZS | 0 | 0 | 0 | 0 | 420 | 0 | 0 | 0 |
|  |  | 4.8 | 1.5 | 1.5 | 448 | 1.8 | 1.9 | 1.9 |
|  |  | 9.6 | 2.8 | 2.7 | 464 | 3.5 | 3.5 | 3.5 |
|  |  | 19.2 | 5.2 | 5.2 | 513 | 6.4 | 6.4 | 4.1 |
|  |  | 28.8 | 7.4 | 7.5 | n.d. | 9.0 | 8.9 | 4.1 |
|  |  | 38.4 | 9.3 | 9.6 | n.d. | 11.0 | 11.0 | 3.8 |
| Z0.83AS | 0.83 | 0 | 0 | 0 | 459 | 0 | 0 | 0 |
|  |  | 4.8 | 1.5 | 1.6 | 496 | 2.1 | 2.0 | 2.4 |
|  |  | 9.6 | 2.8 | 2.8 | 515 | 3.7 | 3.7 | 4.0 |
|  |  | 19.2 | 5.2 | 5.0 | 549 | 6.3 | 6.5 | 5.2 |
|  |  | 25.0 | 6.5 | 6.1 | 570 | 7.8 | 7.7 | 5.4 |
|  |  | 38.4 | 9.3 | 8.9 | n.d. | 11.0 | 11.0 | 5.4 |
| Z1.66AS | 1.66 | 0 | 0 | 0 | 507 | 0 | 0 | 0 |
|  |  | 4.8 | 1.5 | 1.6 | 533 | 2.0 | 2.0 | 2.3 |
|  |  | 9.6 | 2.8 | 2.9 | 548 | 3.7 | 3.7 | 4.1 |
|  |  | 19.2 | 5.2 | 5.3 | 575 | 6.5 | 6.7 | 5.6 |
|  |  | 25.0 | 6.5 | 6.6 | 598 | 8.1 | 8.3 | 5.7 |
|  |  | 38.4 | 9.3 | 9.3 | n.d. | 11.0 | 11.0 | 5.6 |
| Z2.5AS | 2.5 | 0 | 0 | 0 | 548 | 0 | 0 | 0 |
|  |  | 4.8 | 1.5 | 1.7 | 571 | 1.9 | 2.0 | 2.2 |
|  |  | 9.6 | 2.8 | 3.0 | 576 | 3.4 | 3.7 | 4.0 |
|  |  | 19.2 | 5.2 | 5.5 | 593 | 6.2 | 6.4 | 6.3 |
|  |  | 28.8 | 7.4 | 7.6 | 620 | 8.4 | 8.8 | 6.6 |
|  |  | 38.4 | 9.3 | 9.7 | n.d. | 11.0 | 11.0 | 6.7 |
| Z4.2AS | 4.2 | 0 | 0 | 0 | 611 | 0 | 0 | 0 |
|  |  | 4.8 | 1.5 | 1.6 | 528 | 1.9 | 2.2 | 2.3 |
|  |  | 9.6 | 2.8 | 2.9 | 630 | 3.5 | 3.8 | 4.0 |
|  |  | 19.2 | 5.2 | 5.2 | 641 | 6.5 | 6.8 | 6.1 |
|  |  | 28.8 | 7.4 | 7.3 | 660 | 8.8 | 9.3 | 6.8 |

TABLE 1-continued

Catalysts prepared and relative analyses

| Composit. | Al$_2$O$_3$ (w %) | Impreg. solution of SO$_4^-$ C$_0$ (g/l) | w % of SO$_4^-$ in gel dried at 110° C. (calculated) | w % of SO$_4^-$ in gel dried at 110° C. (analysis) | Crystallization temperature (° C.) (DTA analysis) | w % of SO$_4^-$ in product calcined at 450° C. | w % of SO$_4^-$ in product calcined at 550° C. | w % of SO$_4^-$ in product calcined at 650° C. |
|---|---|---|---|---|---|---|---|---|
|  |  | 38.4 | 9.3 | 9.1 | n.d. | 11.0 | 11.0 | 9.3 |
| Z7.6AS | 7.6 | 0 | 0 | 0 | 639 | 0 | 0 | 0 |
|  |  | 4.8 | 1.5 | 1.6 | 660 | 2.0 | 2.1 | 2.1 |
|  |  | 9.6 | 2.8 | 3.0 | 659 | 3.6 | 4.0 | 3.8 |
|  |  | 19.2 | 5.2 | 5.4 | 669 | 6.6 | 6.9 | 6.5 |
|  |  | 28.8 | 7.4 | 7.5 | n.d. | 9.3 | 9.8 | 8.6 |
|  |  | 38.4 | 9.3 | 9.7 | n.d. | 11.5 | 12.0 | 10.0 |

TABLE 2

(example 1) - Textural properties

| Calcination temperature (° C.) | 650 | | |
|---|---|---|---|
| w % SO$_4^-$ (weight) | 0 | 3.5 | 3.8 |
| Surface area (m$^2$g$^{-1}$) | 50 | 114 | 121 |
| Total pore volume (cm$^3$g$^{-1}$) | 0.095 | 0.120 | 0.113 |
| r$_p^{max}$ (nm) | 4.8 | 2.5 | 2.3 |

TABLE 3

(example 2) - Textural and mechanical properties

| Calcination temperature (° C.) | 650 | | |
|---|---|---|---|
| w % SO$_4^-$ (weight) | 0 | 4.0 | 5.4 |
| Surface area (m$^2$g$^{-1}$) | 91 | 150 | 154 |
| Total pore volume (cm$^3$g$^{-1}$) | 0.153 | 0.152 | 0.144 |
| r$_p^{max}$ (nm) | 4.0 | 2.3 | 2.0 |
| Average crush strength (N) | 33.1 | 22.0 | 11.2 |
| Standard deviation (N) | 5.4 | 6.7 | 3.4 |
| 80% spread (N) | 26.2–40.0 | 13.4–30.5 | 6.8–15.6 |
| 95% reliability (N) | 29.8–36.5 | 17.8–26.1 | 9.1–13.3 |

TABLE 4

(example 3) - Textural and mechanical properties

| Calcination temperature (° C.) | 650 | | |
|---|---|---|---|
| w % SO$_4^-$ (weight) | 0 | 4.1 | 5.6 |
| Surface area (m$^2$g$^{-1}$) | 94 | 155 | 174 |
| Total pore volume (cm$^3$g$^{-1}$) | 0.162 | 0.156 | 0.148 |
| r$_p^{max}$ (nm) | 4.0 | 2.3 | 1.8 |
| Average crush strength (N) | 28.3 | 17.2 | 11.6 |
| Standard deviation (N) | 5.8 | 5.5 | 2.6 |
| 80% spread (N) | 20.9–35.7 | 10.2–24.2 | 8.2–15.0 |
| 95% reliability (N) | 24.7–31.9 | 13.8–20.6 | 9.9–13.2 |

TABLE 5

(example 4) Textural and mechanical properties

| Calcination temperature (° C.) | 550 | | | 650 | | |
|---|---|---|---|---|---|---|
| w % SO$_4^-$ (weight) | 0 | 3.7 | 11.0 | 0 | 4.0 | 6.7 |
| Surface area (m$^2$g$^{-1}$) | 135 | 221 | 235 | 108 | 169 | 186 |
| Total pore volume (cm$^3$g$^{-1}$) | 0.182 | 0.200 | 0.162 | 0.176 | 0.175 | 0.164 |
| r$_p^{max}$ (nm) | 2.9 | 1.9 | 1.4 | 4.0 | 2.3 | 1.9 |
| Average crush strength (N) | 19.7 | 37.4 | 38.3 | 15.3 | 11.7 | 12.5 |
| Standard deviation (N) | 3.7 | 5.7 | 4.2 | 4.3 | 5.3 | 6.8 |
| 80% spread (N) | 14.9–24.4 | 30.2–44.7 | 32.0–43.6 | 9.7–20.8 | 4.9–18.5 | 3.7–21.2 |
| 95% reliability (N) | 17.4–22.0 | 33.9–40.9 | 35.7–40.9 | 12.4–18.1 | 8.4–15.0 | 8.2–16.7 |

TABLE 6

(example 5) - Textural and mechanical properties

| Calcination temperature (° C.) | 650 | | |
|---|---|---|---|
| w % SO$_4^-$ (weight) | 0 | 4.0 | 9.3 |
| Surface area (m$^2$g$^{-1}$) | 118 | 178 | 195 |
| Total pore volume (cm$^3$g$^{-1}$) | 0.168 | 0.168 | 0.140 |
| r$_p^{max}$ (nm) | 3.3 | 2.0 | 2.0 |
| Average crush strength (N) | 25.7 | 16.0 | 10.9 |
| Standard deviation (N) | 4.1 | 5.7 | 3.1 |
| 80% spread (N) | 20.4–31.0 | 8.6–23.3 | 6.9–14.9 |
| 95% reliability (N) | 23.1–28.3 | 12.4–18.5 | 9.0–12.8 |

TABLE 7

(example 6) - Textural and mechanical properties

| Calcination temperature (° C.) | | 650 | |
|---|---|---|---|
| w % SO$_4^-$ (weight) | 0 | 3.8 | 10.0 |
| Surface area (m$^2$g$^{-1}$) | 125 | 182 | 190 |
| Total pore volume (cm$^3$g$^{-1}$) | 0.170 | 0.180 | 0.123 |
| r$_p^{max}$ (nm) | 3.3 | 1.9 | 2.3 |
| Average crush strength (N) | 27.9 | 16.6 | 13.9 |
| Standard deviation (N) | 5.4 | 5.0 | 4.7 |
| 80% spread (N) | 21.1–33.8 | 10.1–23.0 | 8.0–19.9 |
| 95% reliability (N) | 24.6–31.2 | 13.5–18.7 | 11.0–16.8 |

TABLE 8

(example 7) - Conversion of n-butane as a function of time

| | | Conversion (%) | | | |
|---|---|---|---|---|---|
| | Catalyst | SO$_4^-$ % | 10 minutes | 1 hour | 2 hours | 20 hours |
| 1 | ZS | 4.1 | 15.9 | 10.5 | 8.8 | 0 |
| 2 | Z0.83AS | 5.2 | 18.2 | 11.7 | 11.4 | 11.2 |
| 3 | Z1.66AS | 5.6 | 16.9 | 11.9 | 11.8 | 11.6 |
| 4 | Z2.5AS | 6.3 | 22.6 | 14.5 | 12.4 | 12.3 |
| 5 | Z4.2AS | 6.1 | 17.7 | 11.7 | 11.7 | 11.5 |
| 6 | Z7.6AS | 6.5 | 16.5 | 11.6 | 9.6 | 8.8 |

What is claimed is:

1. A solid superacid catalyst in the form of spheres or microspheres consisting of a mixed sulfated zirconium oxide and at least one other element selected from the group consisting of the elements of Groups 3–15 and the elements of the lanthanide series of the Periodic Table, alone or combined with each other, prepared by a sol-gel process, comprising:

preparing a zirconium sol, mixed with a thickening agent and optionally with said at least one other element;

adding a non-ionic surface-active agent to the sol, only when microspheres are to be prepared;

dripping and obtaining spheres, or atomizing and obtaining microspheres, the sol into a basic gelation bath;

ageing the spheres or microspheres of gel thus obtained;

washing the spheres or microspheres with water having a pH up to 9 and draining the spheres or microspheres without drying them;

impregnating the spheres or microspheres of gel with an aqueous solution of ammonium sulfate or, if it is not possible to achieve cogelation of said other element selected with the zirconium hydroxide, with a solution of ammonium sulfate and of a salt of said element selected; and drying the spheres or microspheres and calcining them in air at a temperature ranging from 450 to 700° C.

2. The solid superacid catalyst according to claim 1, wherein the oxide of said at least one other element oxide in the mixed oxide of which they are formed ranges from 0.5 to 30% by weight.

3. The solid superacid catalysts according to claim 1 or 2, wherein the element of group 13 is Al.

4. The solid superacid catalysts according to claim 3, wherein the alumina in the mixed oxide ranges from 0.5 to 8% by weight.

5. The solid superacid catalysts according to claim 1, wherein the element of group 3 is Y or La, the element of group 4 is Ti, the element of group 6 is W, the element of group 7 is Mn, the element of group 8 is Fe, the element of group 9 is Co, the element of group 10 is Ni, the element of group 11 is Cu, the element of group 12 is Zn, the element of group 13 is Ga or In, the element of group 14 is Si, Sn or Pb, the element of group 15 is Sb or Bi, the element of the series of lanthanides is Ce, Nd, Sm or Eu.

6. The solid superacid catalyst according to claim 1, which contains at least one metal selected from the group consisting of Pt, Pd, Rh, Ru, Ir and Au.

7. The solid superacid catalysts according to claim 1, wherein the sulfate group content range from 1% to 15% by weight (with respect to the dry product).

8. The solid superacid catalysts according to claim 7, wherein the sulfate group content range from 3% to 10% by weight (with respect to the dry product).

9. The solid superacid catalyst according to claim 1, wherein the spheres have a final dimension ranging from 0.5 mm to 5 mm.

10. The solid superacid catalysts according to claim 9, wherein the spheres have a final dimension of approximately 2 mm.

11. The solid superacid catalyst according to claim 1, wherein the microspheres have a diameter ranging from 1 micron to 0.5 mm.

* * * * *